United States Patent [19]
Cooper, Jr.

[11] Patent Number: 5,353,570
[45] Date of Patent: Oct. 11, 1994

[54] BRIDAL ARCH

[76] Inventor: Leroy Cooper, Jr., 1157 Emporia, Aurora, Colo. 80041

[21] Appl. No.: 30,916

[22] Filed: Mar. 15, 1993

[51] Int. Cl.$^5$ ............................................. E04H 12/00
[52] U.S. Cl. .................. 52/653.2; 248/27.8; 47/41.13; 52/86
[58] Field of Search ............................ 47/41.01, 41.13; 248/158, 159, 27.8; 256/21; 135/86, 102; 362/219; 52/653.2, 86

[56] References Cited

U.S. PATENT DOCUMENTS

| | | | |
|---|---|---|---|
| 516,259 | 3/1894 | Brueckner | 248/27.8 |
| 522,817 | 7/1894 | Zerfas | 256/21 |
| 925,044 | 6/1909 | Schultz | 135/96 |
| 1,529,765 | 3/1925 | McKnight | D25/100 |
| 2,008,311 | 7/1935 | Nebel | 248/158 |
| 3,079,106 | 12/1962 | Johnston | 135/102 |
| 3,768,202 | 10/1973 | Wheelock | 47/41.13 |
| 4,627,588 | 12/1986 | Block | 446/227 |
| 5,057,981 | 10/1991 | Bowen et al. | 362/219 |

OTHER PUBLICATIONS

Des. 333,290, dated Feb. 16, 1993 copy in class D11/117, Art Unit 2902.

*Primary Examiner*—James L. Ridgill, Jr.
*Attorney, Agent, or Firm*—Edwin H. Crabtree; Donald W. Margolis

[57] ABSTRACT

A free standing portable arch for use in weddings, different types of ceremonies and other occasions. The arch is adapted for a bride and groom to stand under while taking wedding vows, posing for wedding pictures and for walking through during the ceremony. An upper portion of the arch includes a first half and a second half. The second half is a mirror image of the first half. The first and second half, when joined together, form a geometric shape such as a heart shape, a star shape, a diamond shape and the like. A lower portion of the arch is formed into an inverted "T" shaped stand. A bottom horizontal member of the stand is used to support the arch on a ground surface or a floor surface. The arch may be constructed of a variety of materials with a preference being lightweight plastic cylindrical tubing. The upper portion and the lower portion of the arch can be decorated with ribbon, floral material and strings of lights for adding color, illumination and attraction to the arch. Also, the arch can be coupled with an additional arch to form a twin arch for walking or standing under. Further, a plurality of arches may be attached to each other to form a tunnel of arches for receiving people therethrough before, during and after the ceremony.

16 Claims, 1 Drawing Sheet

BRIDAL ARCH

BACKGROUND OF INVENTION (a) Field of the Invention

This invention relates to an arch for standing and walking under and more particularly, but not by way of limitation, to a free standing arch which is light weight and portable for use in special occasions such as a wedding, a wedding anniversary, picture taking, and various other events.

(b) Discussion of Prior Art

Heretofore there have been architectural arches used in building structures and arches used in making up floral hedges, arches over gates, and arches incorporated into walls and fences. None of these prior art arches are adapted for moving from one location to another for use in weddings, different types of ceremonies and special occasions.

SUMMARY OF THE INVENTION

In view of the foregoing, it is an object of the present invention to provide a decorated arch for a bride and groom to stand under or walk through during a wedding ceremony. Also, the arch can be used for standing under or kneeling under while taking wedding vows. Further, the arch can be used to stand under when posing for wedding pictures, family pictures and the like.

Another object of the invention is to provide a light weight, portable arch that can be used both outdoors and/or indoors. The arch is easily adaptable for a church setting, banquet halls, schools, a special occasion room and any other location used for special events.

Still another object of the invention is the arch or arches can be decorated with floral arrangements of different types of flowers, ivy, leaf garland, baby's breath, ribbon, bows, bouquets and doves. Also, the arch may include bells and strings of lights for illuminating the arch during a ceremony. The arch is completely handcrafted.

A further object of the portable arch is the shape of the arch may have different types of geometric shapes such as a heart, star, diamond and the like. The arch may be made of lightweight plastic cylindrical tubing which is easy to assemble, strong and can be quickly disassembled for transporting to a different location.

Yet another object of the arch is the arch can be easily attached to another arch to form twin arches. Further, a plurality of arches may be coupled together to form a tunnel of arches for receiving people therethrough during a wedding or other occasion.

The subject arch includes an upper portion having a first half and a second half. The second half is a mirror image of the first half. The first and second half, when joined together, form a geometric shape such as a heart shape, a star shape, a diamond shape and the like. A lower portion of the arch is formed into an inverted "T" shaped stand. A bottom horizontal member of the stand is used to support the arch on a ground surface or a floor surface. The arch may be constructed of a variety of materials with a preference being lightweight plastic cylindrical tubing. The upper portion and the lower portion of the arch can be decorated with ribbon, floral material and strings of lights for adding color, illumination and attraction to the arch. Also, the arch can be coupled with an additional arch to form a twin arch for walking or standing under. Further, a plurality of arches may be attached to each other to form a tunnel of arches for receiving people therethrough before, during and after the ceremony.

These and other objects of the present invention will become apparent to those skilled in the art of wedding arrangements, floral designs and catering of weddings and special occasions from the following detailed description, showing the contemplated novel construction, combination, and elements as herein described, and more particularly defined by the appended claims, it being understood that changes in the embodiments of invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which:

FIG. 5 is an alternate embodiment of a heart shaped hanging arch for hanging a bird cage, picture displays, candles and the like.

DESCRIPTION OF THE PREFERRED EMBODIMENTS

Figure 1:
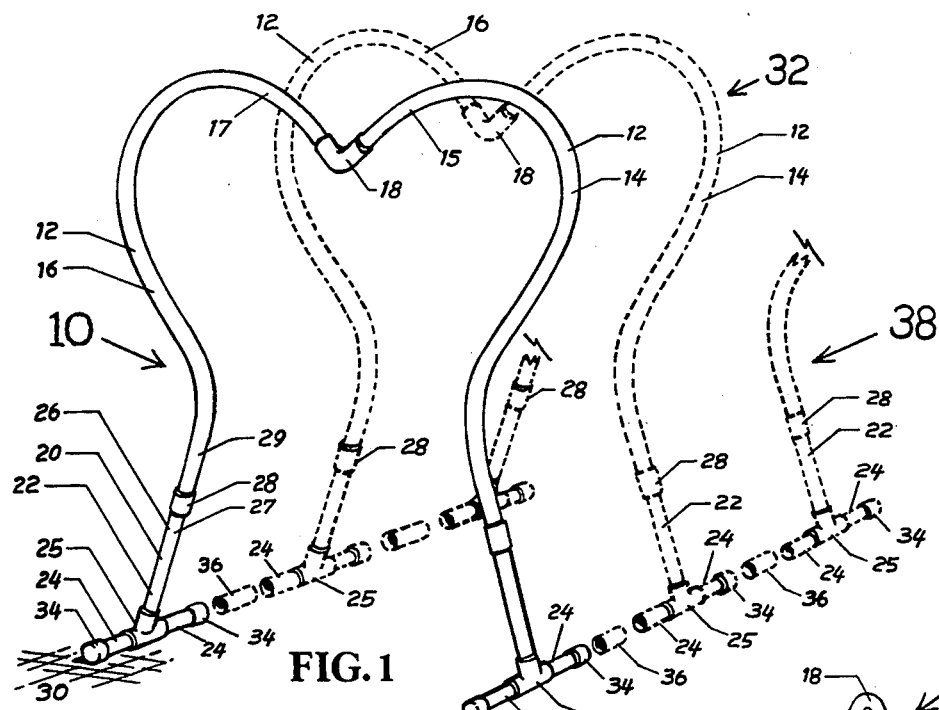
FIG. 1 is a perspective view of the free standing portable arch having a heart shaped design. The arch is shown with a second arch in dotted lines therebehind for forming a twin arch. Also, a portion of a third arch is shown for forming a tunnel of arches.

In FIG. 1 a perspective view of the subject free standing portable arch is shown having a general reference numeral 10. The arch 10 includes an upper portion 12 having a first half 14 and a second half 16. The second half 16 is a mirror image of the first half 14. In this illustration, an upper end 15 of the first half 14 is releasably joined together with an upper end 17 of the second half 16 using a hollow elbow connector 18 to form a heart shape. The arch 10 may be constructed from a variety of solid and hollow construction materials with a preference being lightweight PVC plastic cylindrical tubing. Various sizes of tubing can be used, but 1½ inch diameter tubing has been found to provide the necessary strength and weight for a well built arch. The tubing as shown in the drawings can be heated and formed into various geometric shapes for providing the unique portable arch 10.

A lower portion 20 of the arch 10 is made up of a pair of inverted "T" shaped stands 22. Each stand 22 includes a bottom horizontal member 24 connected to a hollow "T" connector 25. The "T" connector 25 is connected to an upright member 26. An upper end 27 of the upright member 26 is releasably received in one end of a hollow coupling 28. A lower end 29 of the first and second half 14 and 16 is received in an opposite end of the coupling 28. The two couplings 28 are used to secured the two inverted "T" shaped stands 22 to the upper portion 12 of the arch 10. The horizontal member 24 of the stand 22 is used to support the arch 10 on an outside ground surface 30 or an inside floor surface depending on where the portable arch 10 is used. When removing the arch 10 from location to location, the first half 14 can be removed from the second half 16 and the stands 22 removed from the couplings 28 for ease in storage and transporting.

The arch 10 may vary in height, but the arch 10 is generally in a range of 7 to 10 feet high, so that from the elbow connector 18 to the ground surface 30 there is sufficient room for people to walk under the arch 10 without the top of their heads contacting the connector 18 and any decorations attached to the connector 18. Also, the arch 10 is constructed to be sufficiently wide enough from the opposite sides of the first half 14 and the second half 16, so two people such as a bride and groom can easily walk together through the arch 10.

In FIG. 1 a second arch, having a general reference numeral 32, is shown in dotted lines to the rear of the first arch 10. The second arch 32 is positioned for attachment to the first arch 10 to form twin arches. To provide the twin arches, an end cap 34 is removed from one end of each horizontal member 24 of the first arch 10. A hollow coupling 36 is than used to connect the horizontal members 24 of the two arches 10 and 32. In this manner two arches are joined together to form an added and pleasing dimension when used for special occasions. Seen further in FIG. 1 is a portion of a third arch having a general reference numeral 38. The third arch 38 is shown in dotted lines and to the rear of the second arch 32. Again, hollow couplings 36 are used to connect the horizontal members 24 of the aches 32 and 38. It can be appreciated to those skilled in the art, that as described above, two, three or more arches can be easily joined together to form a tunnel of arches for people to walk through or stand under during a ceremony or celebration.

Figure 2:
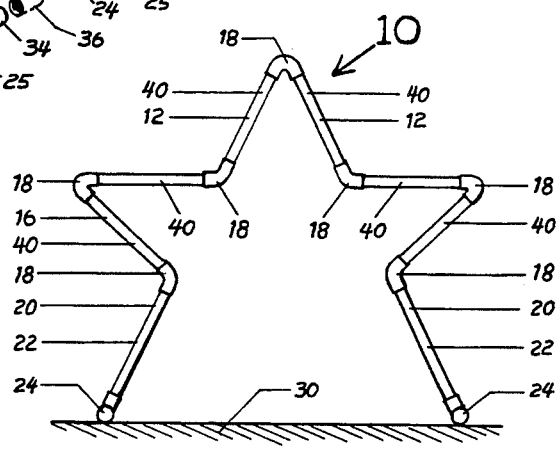
FIG. 2 is a front view of the arch having a star shaped design. This star shaped arch design can be used by a couple or a celebrity to stand under or walk through and where the use of the star design would be appropriate.
Figure 3:
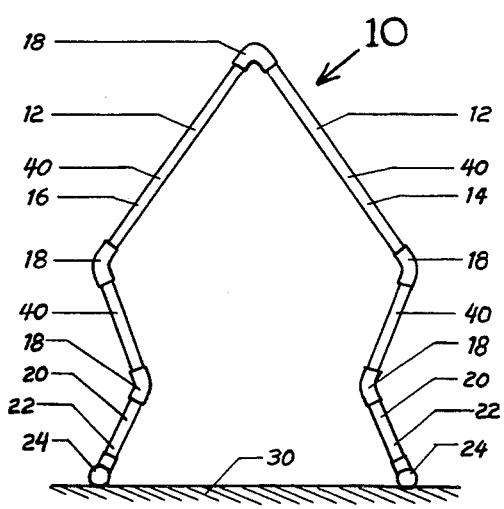
FIG. 3 is a front view of the arch having a diamond shaped design for one or more people to stand under or walk through during a special occasion such as a sporting event, wedding anniversary, and other events where the diamond design would be appropriate.

In FIGS. 2 and 3 the arch 10 is shown having a star shape and a diamond shape. The star shape can be used by couples or celebrities during a ceremony while the diamond shape arch can be used for sporting events, such as related to the game of baseball, a diamond wedding anniversary and other occasions. While the geometric shapes are shown incorporated into the arch 10, various other shapes and designs can easily be used in making up the arch 10.

The upper portion 12 of the star shaped arch 10 and the diamond shaped arch 10 uses elongated straight members 40 connected to each other using elbow connectors 18. Also, if desired the upper portion 12 can be heated and formed into a star or diamond shape without the use of the members 40 and connectors 18. The second half 16 of each arch 10 is a mirror image of the first half 14. The lower portion 20 of the arches 10 is similar to the lower portion 20 shown in FIG. 1 and made up of the inverted "T" shaped stand 22 with the bottom horizontal member 24 used to support each arch 10 on the ground surface 30.

Figure 4:
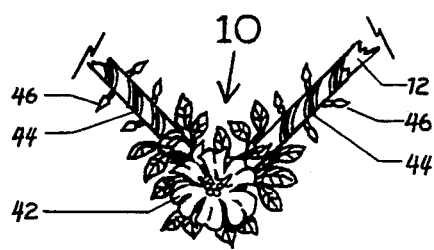
FIG. 4 is a front view of a portion of the top of the arch showing a floral arrangement attached to the arch along with ribbon and a string of lights for illuminating the arch.

In FIG. 4 a portion of the arch 10 is shown wherein the upper portion 12 is decorated with a floral arrangement 42 made up of a flower and leaves. Also, the upper portion 12 of the arch 10 includes a ribbon 44 wrapped therearound along with a string of lights 46 for illuminating the arch 10. Further, the lower portion 20 of the arch 10 can easily be decorated as described above. The decorations can also include a variety of items such as floral arrangements having different types of flowers, ivy, garland, baby's breath, bows, bells, bouquets and doves.

Figure 5:
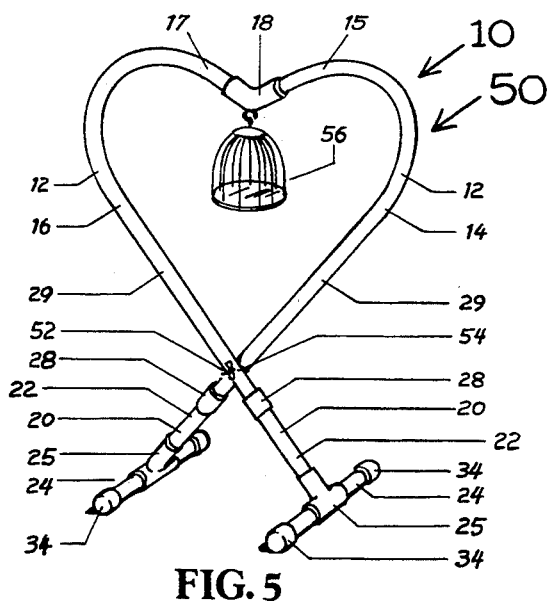

In FIG. 5 an alternate embodiment of the portable arch 10 is shown as a hanging arch having general reference numeral 50. The hanging arch 50 is shown with the upper portion 12 in a heart shaped design. The lower ends 29 of the first and second half 14 and 16 are crossed and secured together using a threaded screw 52 with wing nut 54 for tightening the lower ends 29 firmly together. The lower ends 29 are attached to the removable inverted "T" shaped stands 22 using the hollow couplings 28. In this drawing a bird cage 56 is shown suspended from the elbow connector 18. While the bird cage 56 is shown, various objects can be suspended from the hanging arch 50 such as family pictures, candles and other items appropriate for a wedding or other types of ceremonies.

While the invention has been particularly shown, described and illustrated with reference to the preferred embodiments and modifications thereof, it should be understood by those skilled in the art that equivalent changes in form and detail may be made therein without departing from the true spirit and scope of the invention as claimed, except as precluded by the prior art.

The embodiments of the invention for which an exclusive privilege and property right is claimed are defined as follows:

1. A free standing portable arch for use in weddings, different types of ceremonies and other occasions, the arch is adapted for a bride and groom to stand under while taking wedding vows, posing for wedding pictures, for walking through during the ceremony and suspending items therefrom, the arch comprising:

an upper portion having a first half and a second half, said second half a mirror image of said first half, said first half and second half joined together to form an outline of a geometric shape;

a lower portion connected to said upper portion, said lower portion formed into a pair of stands, said stands having a bottom horizontal member used to support the arch on a ground surface or a floor surface; and said upper portion and said lower portion made of a rigid opaque plastic material, said upper portion heated and formed into the outline of a free standing geometric shape.

2. The arch as described in claim 1 wherein said arch is constructed of lightweight PVC plastic cylindrical tubing.

3. The arch as described in claim 1 wherein said stands are formed into an inverted "T" shape having a bottom horizontal member used to support the arch on a ground surface or a floor surface.

4. The arch as described in claim 1 wherein said upper portion and said lower portion of the arch are decorated with ribbon, floral material and strings of lights for adding color, illumination and attraction to the arch.

5. The arch as described in claim 1 including a second arch wherein said stands of the first arch are coupled to stands of the second arch to form twin arches for walking through or standing under.

6. The arch as described in claim 1 further including a plurality of arches having stands coupled together to form a tunnel of arches for walking through and standing under.

7. The arch as described in claim 1 wherein said arch is formed into an outline of a geometric shape such as a heart shape, a star shape, a diamond shape.

8. Free standing portable arches for use in weddings, different types of ceremonies and other occasions, the arches are adapted for a bride and groom to stand under while taking wedding vows, posing for wedding pictures, for walking through during the ceremony and suspending items therefrom, the arches comprising:

an upper portion having a first half and a second half, said second half a mirror image of said first half, said first half and second half joined together to form an outline of a geometric shape;

a lower portion connected to said upper portion, said lower portion formed into a pair of stands, said stands having a bottom horizontal member used to support the arch on a ground surface or a floor surface, one end of the horizontal member of said stands of a first arch are coupled together with one end of the horizontal member of said stands of a second arch, the coupling of said stands of the first arch to said stands of the second arch forming a twin arch for walking through or standing under.

9. The arches as described in claim 8 further including a third arch, one end of the horizontal member of said stands of the third arch are coupled together with one end of the horizontal member of said stands of the second arch, the coupling of said stands of the first, second, and third arch forming a tunnel of arches for walking through and standing under.

10. Free standing portable arches for use in weddings, different types of ceremonies and other occasions, the arches are adapted for a bride and groom to stand under while taking wedding vows, posing for wedding pictures, for walking through during the ceremony and suspending items therefrom, the arches comprising:

an upper portion having a first half and a second half, said second half a mirror image of said first half, said first half and second half joined together to form an outline of a geometric shape;

a lower portion connected to said upper portion, said lower portion formed into a pair of stands, said stands having a bottom horizontal member used to support the arches on a ground surface or a floor surface, one end of the horizontal member of said stands of a first arch are coupled together with one end of the horizontal member of said stands of a second arch, the coupling of said stands of the first arch to said stands of the second arch forming a twin arch for walking through or standing under; and said upper portion and said lower portion of the first and second arches made of a rigid opaque plastic material, said upper portion heated and formed into the outline of a free standing geometric shape.

11. The arches as described in claim 10 wherein said stands of the first and second arch are releasably coupled to said first half and said second half of said upper portion.

12. The arches as described in claim 10 wherein said first half of said upper portion is releasably coupled to said second half of said upper portion.

13. The arches as described in claim 10 wherein said arches is constructed of lightweight PVC plastic cylindrical tubing.

14. The arch as described in claim 10 wherein said stands are formed into an inverted "T" shape having a bottom horizontal member used to support the arches on a ground surface or a floor surface.

15. The arches as described in claim 10 wherein said upper portion and said lower portion of the arches are decorated with ribbon, floral material and strings of lights for adding color, illumination and attraction to the arch.

16. The arch as described in claim 10 wherein said arches is formed into an outline of a geometric shape such as a heart shape, a star shape, a diamond shape.

* * * * *